United States Patent
Rosenbluth et al.

(10) Patent No.: US 7,853,951 B2
(45) Date of Patent: Dec. 14, 2010

(54) LOCK SEQUENCING TO REORDER AND GRANT LOCK REQUESTS FROM MULTIPLE PROGRAM THREADS

(75) Inventors: Mark Rosenbluth, Uxbridge, MA (US); Sanjeev Jain, Shrewsbury, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1480 days.

(21) Appl. No.: 11/190,112

(22) Filed: Jul. 25, 2005

(65) Prior Publication Data
US 2007/0022429 A1 Jan. 25, 2007

(51) Int. Cl.
*G06F 9/46* (2006.01)
*G06F 13/00* (2006.01)
*G06F 7/00* (2006.01)

(52) U.S. Cl. .......................... 718/104; 711/152; 707/8
(58) Field of Classification Search ................. 718/104; 711/152; 707/8; 370/389
See application file for complete search history.

(56) References Cited

U.S. PATENT DOCUMENTS

| | | | |
|---|---|---|---|
| 5,408,629 A * | 4/1995 | Tsuchiya et al. ............. 711/151 |
| 6,307,789 B1 | 10/2001 | Wolrich et al. |
| 6,324,624 B1 | 11/2001 | Wolrich et al. |
| 6,427,196 B1 | 7/2002 | Adiletta et al. |
| 6,463,072 B1 | 10/2002 | Wolrich et al. |
| 6,532,509 B1 | 3/2003 | Wolrich et al. |
| 6,606,704 B1 | 8/2003 | Adiletta et al. |
| 6,625,654 B1 | 9/2003 | Wolrich et al. |
| 6,629,237 B2 | 9/2003 | Wolrich et al. |
| 6,631,462 B1 | 10/2003 | Wolrich et al. |
| 6,661,794 B1 | 12/2003 | Wolrich et al. |
| 6,868,476 B2 | 3/2005 | Rosenbluth et al. |
| 6,934,951 B2 | 8/2005 | Wilkinson, III et al. |
| 6,952,824 B1 | 10/2005 | Hooper et al. |
| 6,978,330 B1 * | 12/2005 | Joffe et al. .................. 710/240 |
| 6,983,350 B1 | 1/2006 | Wheeler et al. |
| 7,551,617 B2 * | 6/2009 | Eatherton et al. ........... 370/392 |
| 2002/0013861 A1 | 1/2002 | Adiletta et al. |
| 2002/0056037 A1 * | 5/2002 | Wolrich et al. .............. 712/215 |
| 2003/0041216 A1 | 2/2003 | Rosenbluth et al. |
| 2003/0145173 A1 | 7/2003 | Wilkinson, III et al. |
| 2004/0032867 A1 * | 2/2004 | Basso et al. ................. 370/389 |
| 2004/0098723 A1 | 5/2004 | Radovic et al. |

(Continued)

FOREIGN PATENT DOCUMENTS

WO    WO 2007/015900    5/2007

OTHER PUBLICATIONS

Zhou et al. "Queue Management for QoS Provision Build on Network Processor", 2003, IEEE, pp. 219-224.*

(Continued)

*Primary Examiner*—Chat C Do
*Assistant Examiner*—Kenneth Tang
(74) *Attorney, Agent, or Firm*—Grossman, Tucker, Perreault & Pfleger, PLLC

(57) ABSTRACT

In general, in one aspect, the disclosure describes a processor that includes multiple multi-threaded programmable units integrated on a single die. The die also includes circuitry communicatively coupled to the programmable units that reorders and grants lock requests received from the threads based on an order in which the threads requested insertion into a sequence of lock grants.

21 Claims, 16 Drawing Sheets

U.S. PATENT DOCUMENTS

2004/0213104 A1   10/2004   Chou
2005/0038964 A1    2/2005   Hooper et al.
2005/0039182 A1    2/2005   Hooper et al.
2006/0036822 A1*  2/2006   Kaji ........................... 711/163

OTHER PUBLICATIONS

PCT, International Preliminary Report on Patentability (Chapter I of the Patent Cooperation Treaty), Application No. PCT/US2006/027984, mailed Feb. 7, 2008.

Johnson et al: IXP2400 / 2800 Programming, The Complete Microengine Coding Guide, May 2003, pp. 9-60, 183-216.

Carlson: Itnel Internet Exchange architecture and Applications, A Practical Guide to IXP2XXX Network Processors, Intel Press, pp. 23-27, 51-65, 183-231.

Johnson et al: IXP1200 Programming The Microengine Coding Guide for the Intel Network Processor Family, Intel Press, pp. 7-35, 99-194.

Wenjiang Zhou et al., "Queue management for QoS provision build on network processor", proceedings of the nineth IEEE Workshop on Future Trends of Distributed Computing Systems, May 28, 2003, XP010643151, pp. 219-224.

Tammo Spalink et al., "Building a robust software-based router using network processors", proceedings of the eighteenth ACM Symposium on Operating Systems Principals, 2001, XP002413923, pp. 216-229. http://citeseer.ist.psu.edu/spalink01building.html, retrieved on Mar. 12, 2008.

Intel, "Intel IXP1200 Family Hardware Reference Manual—Introduction" XP002373666, Dec. 7, 2001, ftp://download.intel.com/design/network/manuals/27830309.pdf, retrieved on Mar. 12, 2008, 272 pages.

Magnusson P. et al., "Queue locks on cache coherent multiprocessors", Parallel Processing Symposium, 1994, Proceedings Eighth International Cancun, Mexico, Apr. 26-29, 1994, IEEE Comput. Soc. XP010098628, pp. 165-171.

Allen J. R. et al., "IBM PowerNP Network Processor: Hardware, Software, and Applications", IBM Journal of Research and Development, International Business Machines Corporation, New York, New York. vol. 47, No. 2-3, May 2003, XP002315024, pp. 177-193.

International Search Report and Written Opinion, International Application No. PCT/US2006/027984, mailed Jan. 29, 2007, 15 pages.

\* cited by examiner

```
// this code is inside dispatch critical section
get_seq_num[ Sequenced_Lock_Domain_a, seq_a], sig_1

// compute shared data address
//
ctx_arb[ sig_1] ; make sure the seq number is here //---------
//---------
read_lock[ Sequenced_Lock_Domain_a, seq_a, address_a], sig_4
ctx_arb[ sig_4], high_priority
//---------
//---------
critical_section_a#:
// do something with the shared data
. . .
. . .
// write the modified data back to memory
nram[write, address_a]
unlock[ address_a]
//---------
```

LOCK SEQUENCING TO REORDER AND GRANT LOCK REQUESTS FROM MULTIPLE PROGRAM THREADS

REFERENCE TO RELATED APPLICATIONS

This relates to a U.S. patent application filed on the same day entitled "INTER-THREAD COMMUNICATION OF LOCK PROTECTED DATA" having 11/190,115 and naming Mark Rosenbluth, Gilbert Wolrich, and Sanjeev Jain as inventors.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network forwarding devices (e.g., "routers", "bridges" and/or "switches") before reaching its destination. These intermediate devices often perform a variety of packet processing operations. For example, intermediate devices often determine how to forward a packet further toward its destination or to determine the quality of service to provide.

Network devices are carefully designed to keep apace the increasing volume of network traffic. Some architectures implement packet processing using "hard-wired" logic such as Application Specific Integrated Circuits (ASICs). While ASICs can operate at high speeds, changing ASIC operation, for example, to adapt to a change in a network protocol can prove difficult.

Other architectures use programmable devices known as network processors. Network processors enable software programmers to quickly reprogram network operations. Some network processors feature multiple processing cores to amass packet processing computational power. These cores may operate on packets in parallel. For instance, while one core determines how to forward one packet further toward its destination, a different core determines how to forward another. This enables the network processors to achieve speeds rivaling ASICs while remaining programmable.

BRIEF DESCRIPTION OF THE DRAWINGS

FIG. 10 is a listing of source code using a lock.

DETAILED DESCRIPTION

Figure 1A:
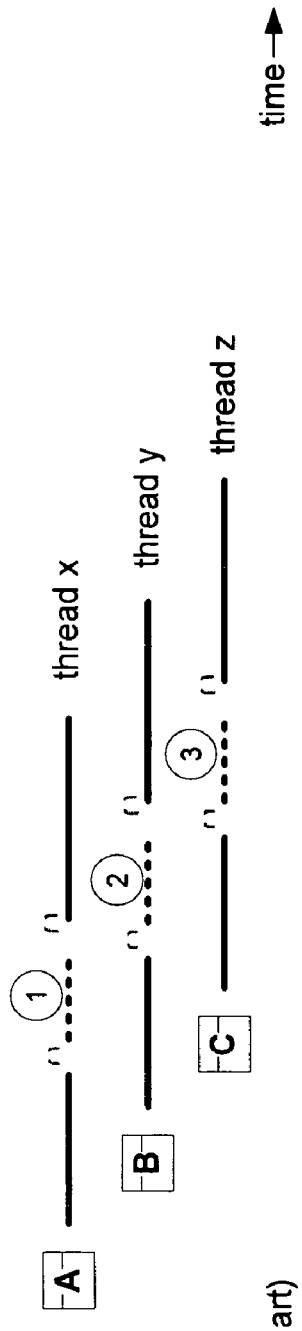
FIGS. 1A-1C are diagrams illustrating a lock used by different threads.

A wide variety of applications use locks to control access to shared resources. For example, FIG. 1A depicts a scheme where different packet processing threads (x, y, z) process different packets (A, B, C). For instance, each thread may determine how to forward a given packet further towards its network destination. As shown, as the packets arrive, they are assigned to available packet processing threads. Potentially, these different packets may belong to the same flow. For example, the packets may share the same source/destination pair, be part of the same TCP (Transmission Control Protocol) connection, or the same Asynchronous Transfer Mode (ATM) circuit. Typically, a given flow has associated state data that is updated for each packet. For example, in TCP, a Transmission Control Block (TCB) describes the current state of a TCP connection. In the scenario depicted in FIG. 1A, if packets A, B, C belong to the same flow, without safeguards, threads x, y, z may each attempt to modify the same flow related data (e.g., TCB) at the same time, potentially, causing inconsistencies in the data.

Figure 1B:
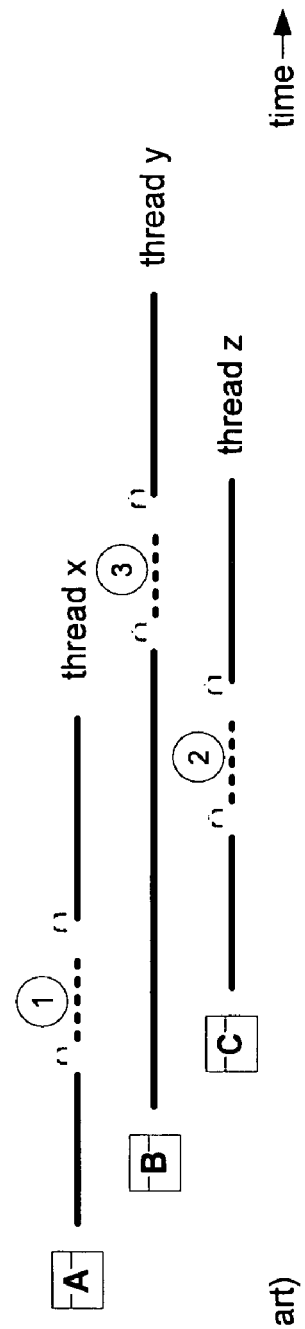

As shown in FIG. 11A, to coordinate access to shared data, the threads use a lock (depicted as a padlock). The lock provides a mutual exclusion mechanism that ensures only a single thread owns a lock at a time. After a thread acquires a lock, lock requests from other threads are either denied and/or queued. Thus, a thread that has acquired a lock can perform whatever operations are needed with the assurance that no other thread is accessing the data protected by the lock at the same time. A typical use of a lock is to create a "critical section" of instructions—code that is only executed by one thread at a time (shown as a dashed line in FIGS. 1A-1C). Entry into a critical section is often controlled by a "wait" or "enter" routine that only permits subsequent instructions to be executed after acquiring a lock. For example, a thread's critical section may read, modify, and write-back flow data for a packet's flow. As shown in FIG. 1A, thread x acquires the lock, executes lock protected code for packet A (e.g., modifies flow data), and releases the lock. After thread x releases the lock, waiting thread y can acquire the lock, execute the protected code for packet B, and release the lock, followed likewise by thread z for packet C.

In the example of FIG. 1A, the threads happened to request the locks in the same order in which packets arrived and likewise executed the critical sections in the same sequence (shown as "1", "2", and "3"). Potentially, however, the time it takes to process different packets may vary. In a scheme that grants locks in the order in which lock requests occur, this varying processing time, among other possible factors, may cause execution of critical sections for packets to vary from the order in which packets arrive. For example, in FIG. 1B thread y takes a relatively long time to process packet B before requesting the lock. Due to this delay in processing packet B, thread z may request the lock and execute the critical section for packet C before thread y executes the critical section for packet B. This failure to perform the critical section code in the order of packet receipt may violate a system's design requirement and/or severely disrupt operation.

Figure 1C:
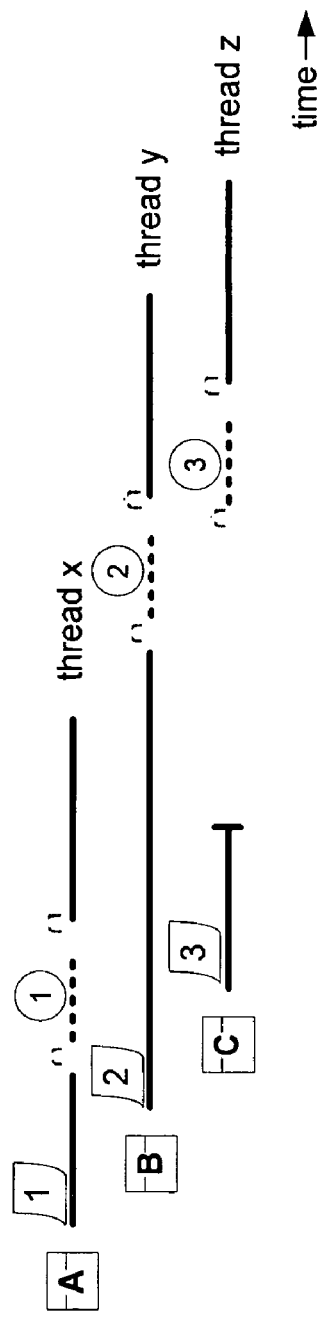

FIG. 1C depicts a scheme where the threads can request a place in a sequence of lock grants before actually requesting the lock. For example, as shown in FIG. 1C, threads x, y, and z request a place in a lock grant sequence (shown as sequence numbers labeled "1", "2", and "3") soon after being assigned a packet. As an example, each thread may receive a sequence number that is incremented for each successive request. As shown, by granting a lock based on the established sequence instead of based on the order of received lock requests, the scheme preserves the order in which the threads execute the critical section despite thread y's delay in requesting the lock.

The scheme shown in FIG. 1C preserved the order of critical section execution at the cost of thread z waiting idly until thread y released the lock. To reduce thread idling, a system can maintain multiple sequence domains. For example, the processing of packets belonging to different protocols should ordinarily be execution order independent relative to one another. For instance, the order in which ATM (Asynchronous Transfer Mode) packets ("cells") are processed may be irrelevant to the order in which IP (Internet Protocol) packets are processed. Thus, a thread processing an ATM cell may request a place in an "ATM" lock sequence domain instead of a different "IP" lock sequence domain.

The following describes a processor unit (a "lock manager") that supports the different locking schemes illustrated above. That is, the processor unit can grant locks in the order requested (e.g., FIGS. 1A and 1B) or provide sequencing where threads are granted a lock in a sequenced order (e.g., FIG. 1C). Additionally, the processor unit can maintain multiple sequence domains to reduce the potential for wasted thread cycles.

Figure 2:
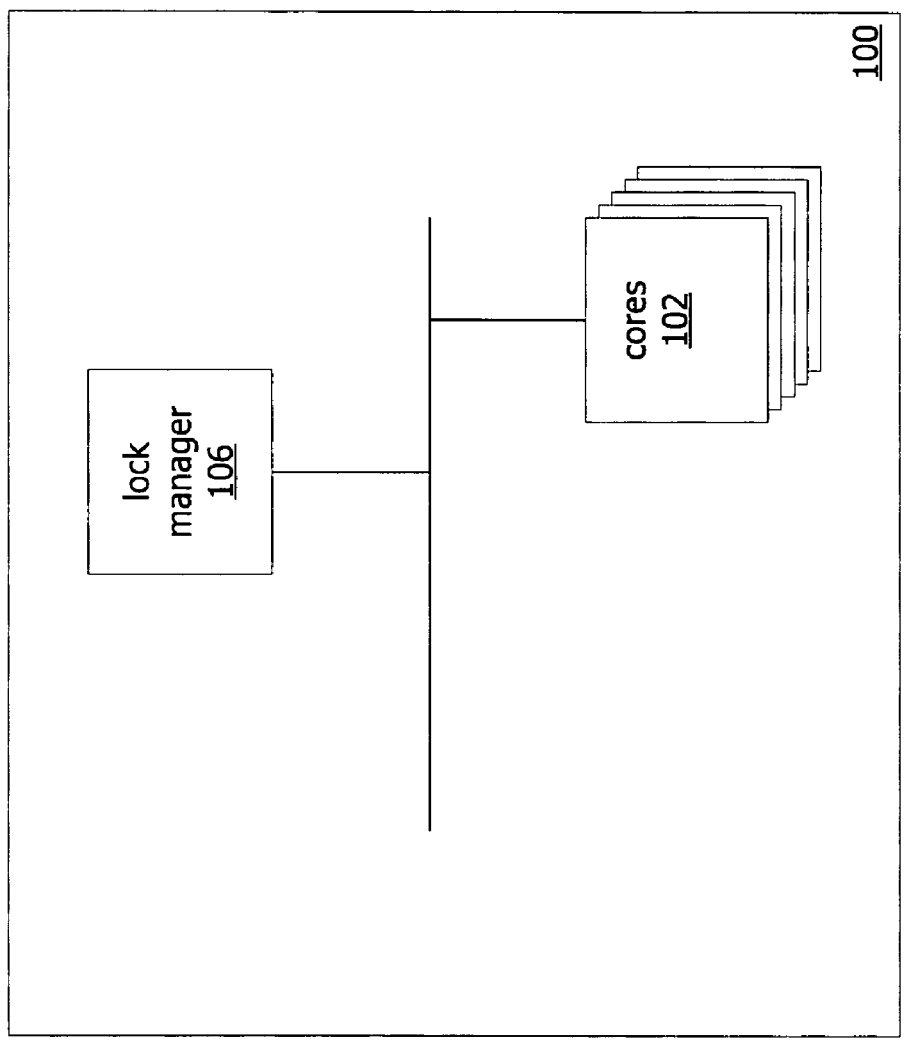
FIG. 2 is a diagram of a multi-core processor.

The processor unit may be integrated into a variety of processors. For instance, FIG. 2 depicts a processor 100 that features multiple programmable cores 102 integrated on a single integrated die. The multiple cores 102 may be multi-threaded. For example, the cores may feature storage for multiple program counters and thread contexts. Potentially, the cores may feature thread-swapping hardware support. Such cores 102 may use pre-emptive multi-threading (e.g., threads are automatically swapped at regular intervals), swap after execution of particular instructions (e.g., after a memory reference), or the core may rely on threads to voluntarily relinquish execution.

As shown, the processor 100 includes a lock manager 106 that provides dedicated hardware locking support to the cores 102. The manager 106 can provide a variety of locking services such as allocating a sequence number in a given sequence domain to a requesting core/core thread, reordering and granting locks requests based on constructed locking sequences, and granting locks based on the order of requests. In addition, the manager 106 can speed critical section execution by optionally initiating delivery of shared data (e.g., lock protected flow data) to the core/thread requesting a lock. That is, instead of a thread finally receiving a lock grant only to wait for completion of a memory read to access lock protected data, the lock manager 106 can issue a memory read on the thread's behalf and identify the requesting core/thread as the data's destination. This can reduce the amount of time a thread spends in a critical section and, consequently, the amount of time a lock is denied to other threads.

Figure 3:
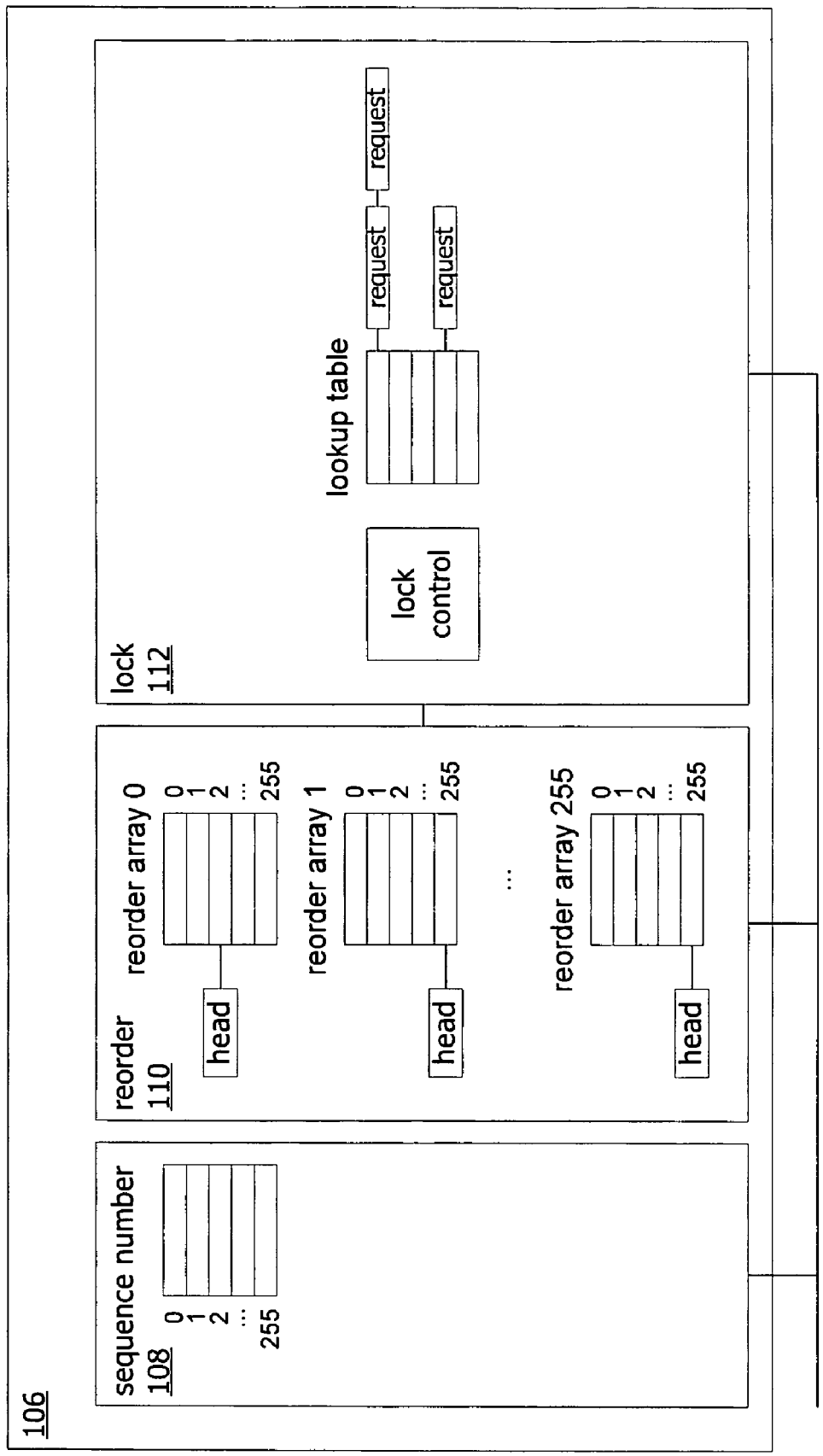
FIG. 3 is a diagram of a device to manage locks.

FIG. 3 illustrates logic of a sample lock manager 106. The lock manager 106 shown includes logic to grant sequence numbers 108, service requests in an order corresponding to the granted sequence numbers 110, and queue and grant 112 lock requests. Operation of these blocks is described in greater detail below.

Figure 3A:
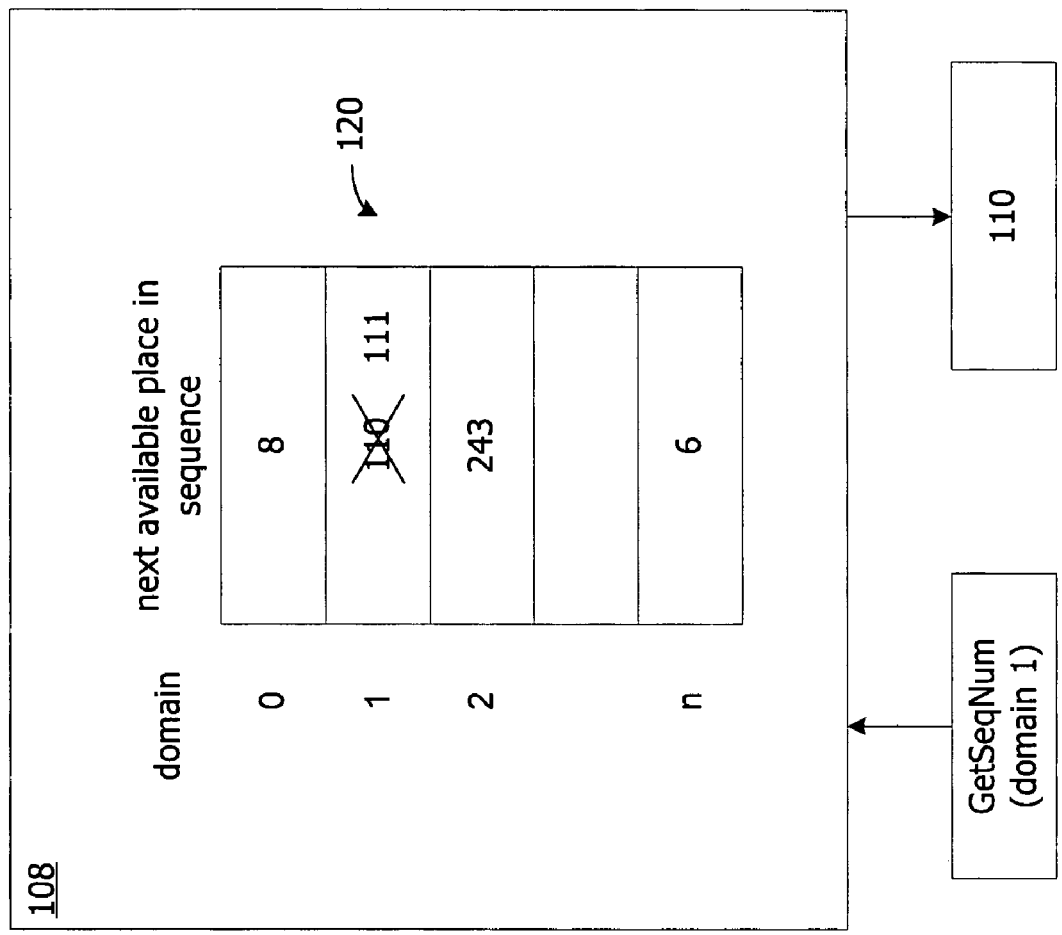
FIG. 3A is a diagram of logic to allocate sequence numbers.

FIG. 3A depicts logic 108 to allocate and issue sequence numbers to requesting threads. As shown, the logic 108 accesses a sequence number table 120 having n entries (e.g., n=256). Each entry in the sequence number table 120 corresponds to a different sequence domain and identifies the next available sequence number. For example, the next sequence number for domain "2" is "243". Upon receipt of a request from a thread for a sequence number in a particular sequence domain, the sequence number logic 108 performs a lookup into the table 120 to generate a reply identifying the sequence number allocated to the requesting core/thread. To speed such a lookup, the request's sequence domain may be used as an index into table 120. For example, as shown, the request for a sequence number in domain "1" results in a reply identifying entry 1's "110" as the next available sequence number. The logic 108 then increments the sequence number stored in the table 120 for that domain. For example, after identifying "110" as the next sequence number for domain "1", the next sequence number for domain number is incremented to "111". The sequence numbers have a maximum value and wrap around to zero after exceeding this value. Potentially, a given request may request multiple (e.g., four) sequence numbers at a time. These numbers may be identified in the same reply.

Figure 3B:
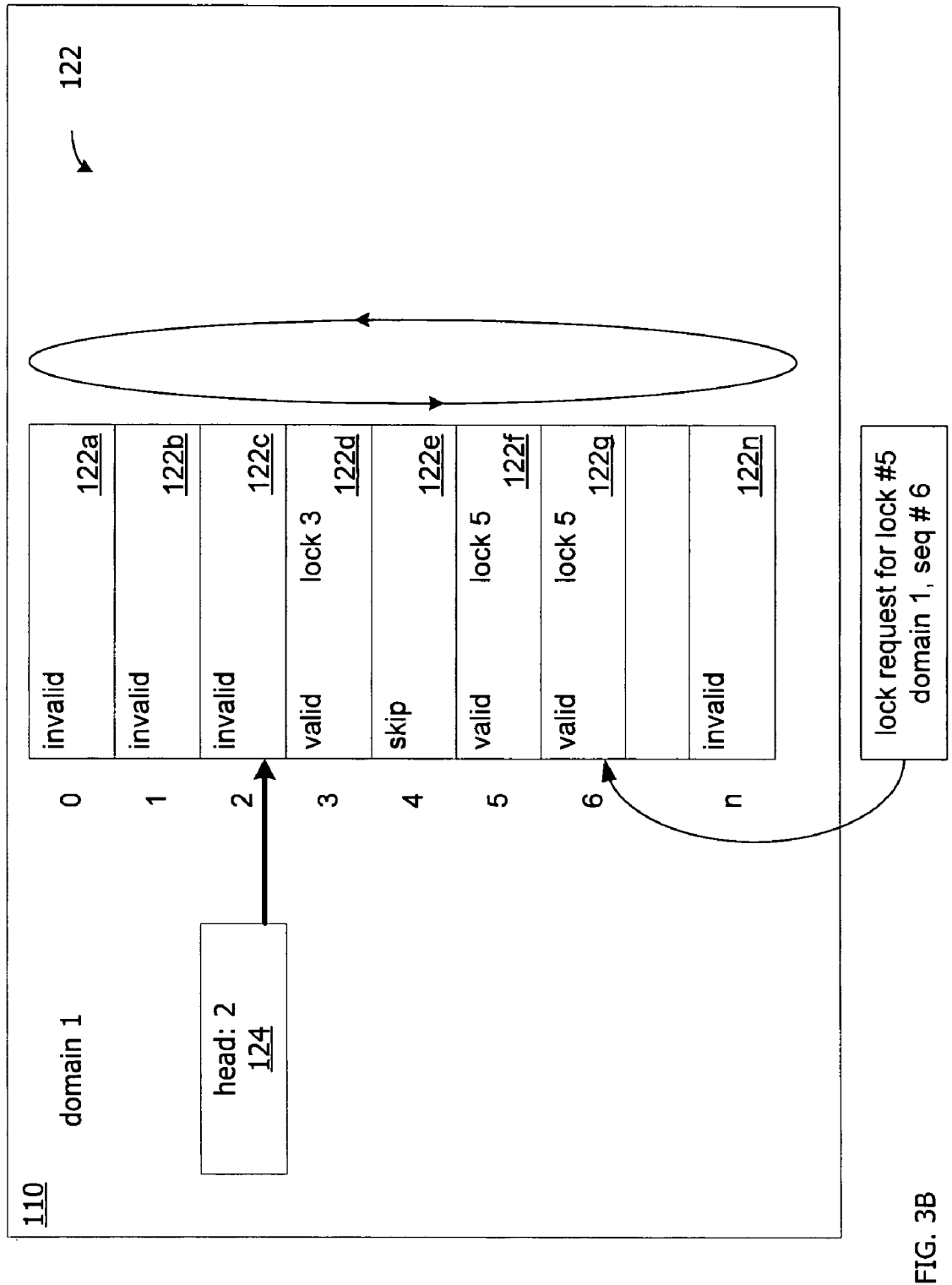
FIG. 3B is a diagram of logic to reorder sequenced lock requests.

After receiving a sequence number, a thread can continue with packet processing operations until eventually submitting the sequence number in a lock request. A lock request is initially handled by reorder circuitry 110 as shown in FIG. 3B. The reorder circuitry 110 queues lock requests based on their place in a given sequence domain and passes the lock request to the lock circuitry 112 when the request reaches the head of the established sequence. For lock requests that do not specify a sequence number, the reorder circuitry 110 passes the requests immediately to the lock circuitry 112 (shown in FIG. 3C).

For lock requests participating in the sequencing scheme, the reorder circuitry 110 can queue out-of-order requests using a set of reorder arrays for each sequence domain. FIG. 3B shows a single one of these arrays 122 for domain "1". The size of a reorder array may vary. For example, each domain may feature a number of entries equal to the number of threads provided (e.g., # cores x # threads/core). This enables each thread in the system to reserve a sequence number in the same array. However, an array may have more or fewer entries.

As shown, the array 122 can identify lock requests received out-of-sequence-order within the array 122 by using the sequence number of a request as an index into the array 122. For example, as shown, a lock request arrives identifying sequence domain "1" and a sequence number "6" allocated by the sequence circuitry 106 (FIG. 3A) to the requesting thread. The reorder circuitry 110 can use the sequence number of the request to store an identification of the received request within the corresponding entry of array 122 (e.g., sequence number 6 is stored in the sixth array entry). The entry may also store a pointer or reference to data included in the request (e.g., the requesting thread/core and options). As shown, a particular lock can be identified in a lock request by a number or other identifier. For example, if read data is associated with the lock, the number may represent a RAM (Random Access Memory) address. If there is no read data associated with the lock, the value represents an arbitrary lock identifier.

As shown, the array 122 can be processed as a ring queue. That is, after processing entry 122n the next entry in the ring is entry 122a. The contents of the ring are tracked by a "head" pointer which identifies the next lock request to be serviced in the sequence. For example, as shown, the head pointer 124 indicates that the next request in the sequence is entry "2". In other words, already pending requests for sequence numbers 3, 4, and 6 must wait for servicing until a lock request arrives for sequence number 2.

As shown, each entry also has a "valid" flag. As entries are "popped" from the array 122 in sequence, the entries are "erased" by setting the "valid" flag to "invalid". Each entry also has a "skip" flag. This enables threads to release a previously allocated sequence number, for example, when a thread drops a packet before entry into a critical section.

In operation, the reorder circuitry 110 waits for the arrival of the next lock request in the sequence. For example, in FIG. 3B, the circuitry awaits arrival of a lock request allocated sequence number "2". Once this "head-of-line" request arrives, the reorder circuitry 110 can dispatch not only the head-of-line request that arrived, but any other pending requests freed by the arrival. That is, the reorder circuitry can sequentially proceed down the array 122, incrementing the "head" pointer through the ring, request by request, until reaching an "invalid" entry. In other words, as soon as the request arrives for sequence number "2", the pending requests stored in entries "3", "5" and "6" can also be dispatched to the lock circuitry 112. Basically, these requests arrived from threads that ran fast and requested the lock earlier than the next thread in the sequence. The "skip"-ed entry, "4", permits the reorder circuitry to service entries "5" and "6" without delay. Once the reorder circuitry 110 reaches the first "invalid" entry, the domain sequence is, again, stalled until the identified request in the sequence arrives.

Figure 3C:
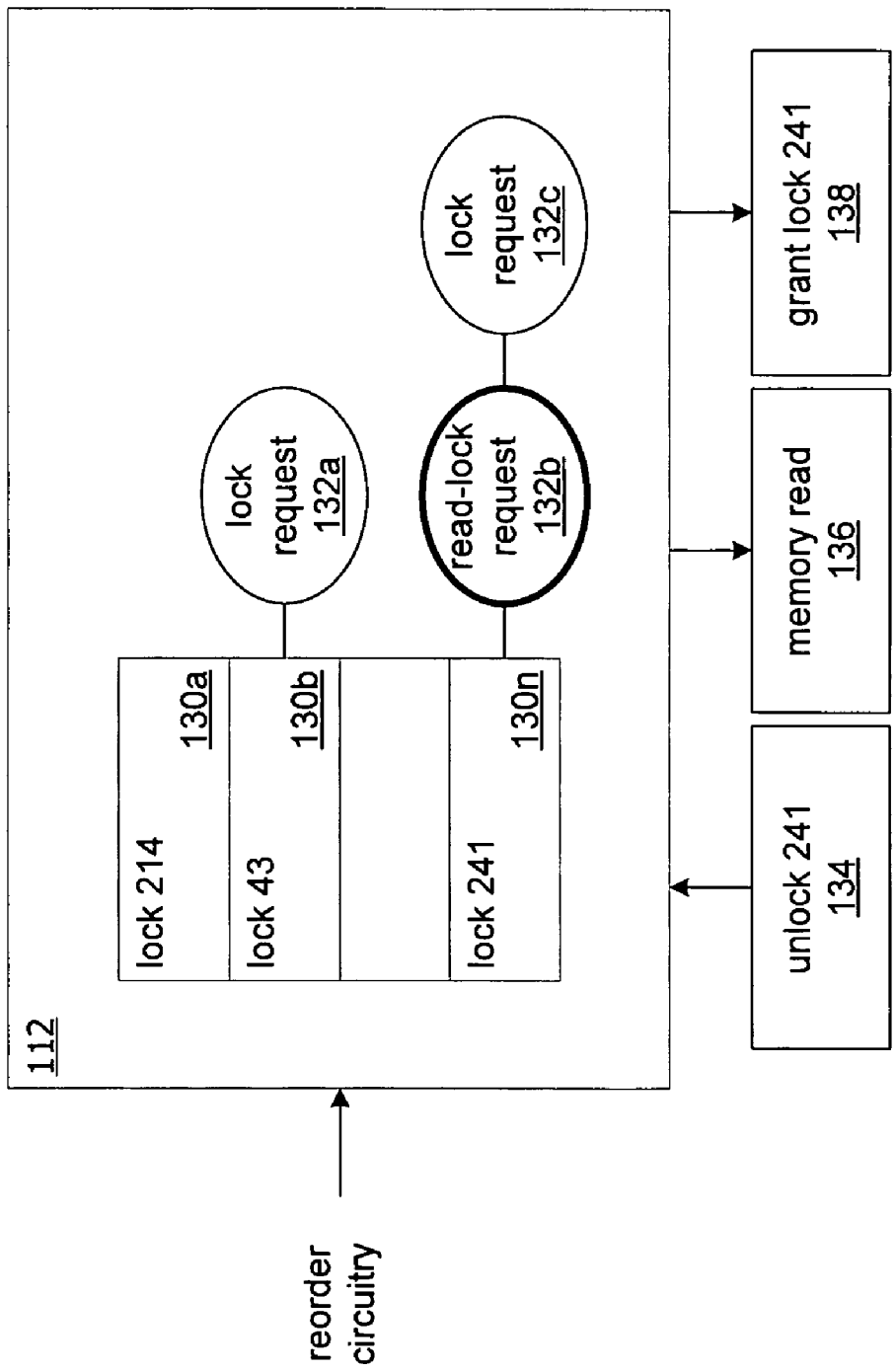
FIG. 3C is a diagram of logic to queue lock requests.

FIG. 3C illustrates lock circuitry 112 logic. As shown and described above, the lock circuitry 112 receives lock requests from the reorder block 110 (e.g., either a non-sequenced request or the next in-order sequence request to reach the head-of-line of a sequence domain). The lock circuitry 112 maintains a table 130 of active locks and queues pending requests for these locks. As new requests arrive at the lock circuitry 112, the lock circuitry 112 allocates entries within the table 130 for newly activated locks (e.g., requests for locks not already in table 130) and enqueues requests for already active locks. For example, as shown in FIG. 3C, lock 241 130n has an associated linked list queuing two pending lock requests 132b, 132c. As the lock circuitry receives unlock requests, the lock circuitry 112 grants the lock to the next queued request and pops the entry from the queue. When an unlock request is received for a lock that does not have any pending requests, the lock can be removed from the active list 130. As an example, as shown in FIG. 3C, in response to an unlock request 134 releasing a lock previously granted for lock 241, the lock circuitry 110 can send a lock grant 138 to the core/thread that issued request 132b and advance request 132c to the top of the queue for lock 241.

Potentially, a thread may issue a non-blocking request (e.g., a request that is either granted or denied immediately). For such requests, the lock circuitry 110 can determine whether to grant the lock by performing a lookup for the lock in the lookup table 130. If no active entry exists for the lock, the lock may be immediately granted and a corresponding entry made into table 130, otherwise the lock may be denied without queuing the request.

As described above, a given request may be a "read lock" request instead of a simple lock request. A read lock request instructs the lock manager 100 to deliver data associated with a lock in addition to granting the lock. To service read lock requests, the lock circuitry 110 can initiate a memory operation identifying the requesting core/thread as the memory operation target as a particular lock is granted. For example, as shown in FIG. 3C, read lock request 132b not only causes the circuitry to send data 138 granting the lock but also to initiate a read operation 136 that delivers requested data to the core/thread.

The logic shown in FIGS. 3 and 3A-3C is merely an example and a wide variety of other manager 106 architectures may be used that provide similar services. For example, instead of allocating and distributing sequence numbers, the sequence numbers can be assigned from other sources, for example, a given core executing a sequence number allocation program. Additionally, the content of a given request/reply may vary in different implementations.

Figure 4:
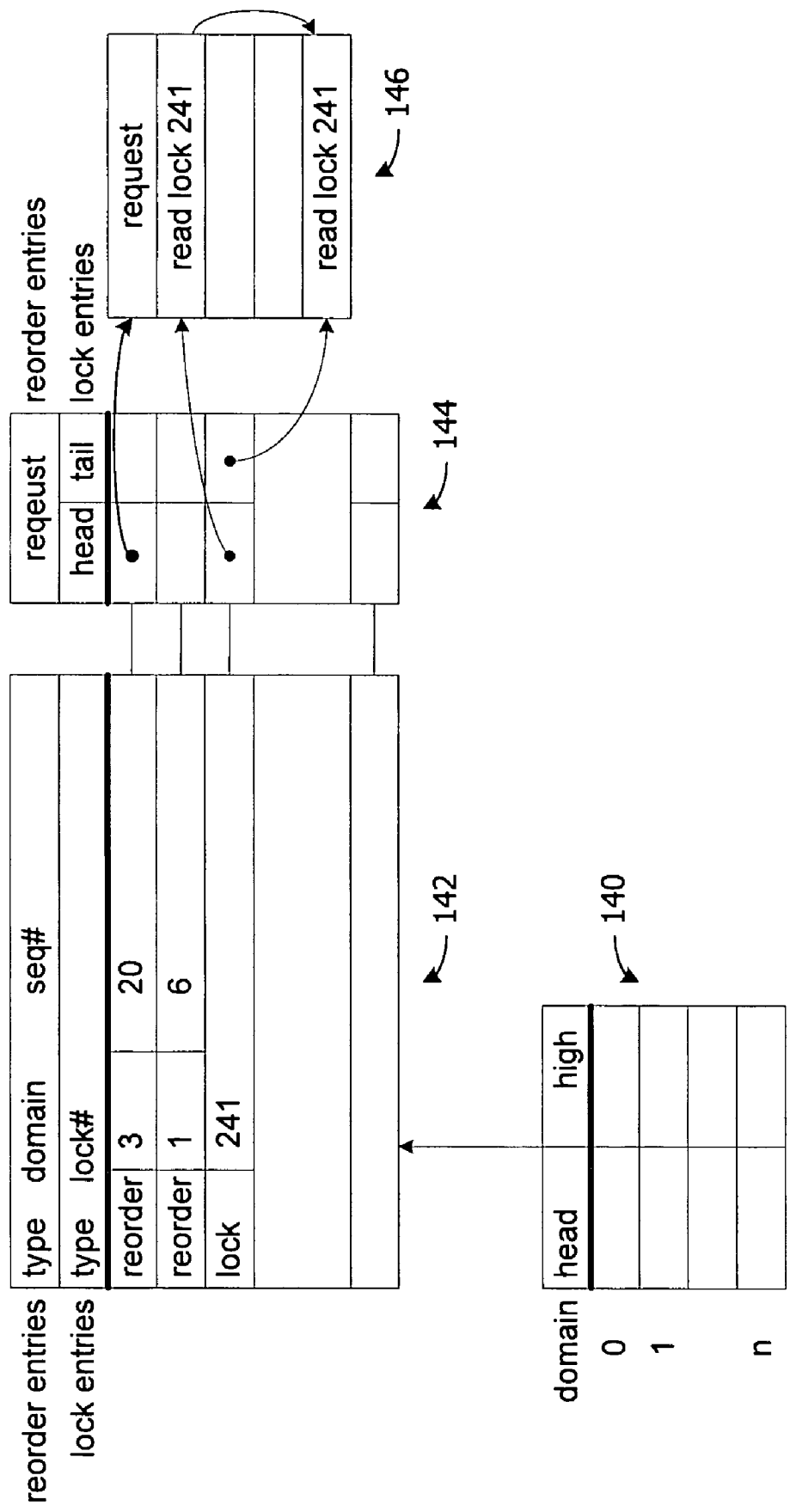
FIG. 4 is a diagram of circuitry to implement the logic of FIGS. 3B and 3C.

The logic shown in FIGS. 3B and 3C could be implemented in a wide variety of ways. For example, an implementation may use RAM (Random Access Memory) to store the N different reorder arrays and the lock tables. However, this storage will, typically, be sparsely populated. That is, a given reorder array may only store a few backlogged out-of-order entries at a time. Instead of allocating a comparatively large amount of RAM to handle worst-case usage scenarios, FIG. 4 depicts a sample implementation that features a single content addressable memory (CAM) 142. The CAM can be used to compactly store information in the reorder arrays (e.g., array 122 in FIG. 3B). That is, instead of storing empty entries in a sparse array (e.g., array 122), only "non-empty" reorder entries can be stored in CAM 142 (e.g., pending or skipped requests) at the cost of storing additional data identifying the domain/sequence number that would otherwise be implicitly identified by array 122. By "squeezing" the empties out, entries for all the reorder arrays can fit in the same CAM 142. For example, as shown, the CAM 142 stores a reorder entry for domain "3" and domain "1". A memory 144 (e.g., a RAM) stores a reference for corresponding CAM reorder entries that identifies the location of the actual lock request data (e.g., requesting thread/core) in memory 146. Thus, in the event of a CAM hit (e.g., a CAM search for domain "3", seq #"20" succeeds), the index of the matching CAM entry is used as an index into memory 144 which, in turn, includes a pointer to the associated request in memory 146. In this implementation instead of an "invalid" flag, "invalid" entries are simply not stored in the CAM, resulting in a CAM-miss when searched for by the CAM 142. Thus, the CAM 142 effectively provides the functionality of multiple reorder arrays without consuming as much memory/die-space.

In addition to storing reorder entries, the CAM 142 can also store the lock lookup table (e.g., 130 in FIG. 3C). As shown, to store the lock table 130 entries and the reorder array 122 entries in the same CAM 142, each entry in the CAM 142 is flagged as either a "reorder" entry or a "lock" entry. Again, this can reduce the amount of memory used by the lock manager 106. The queue associated with each lock is identified by memory 144 that holds corresponding head and tail pointers for the head and tail elements in a lock's linked list queue. Thus, when a given reorder entry reaches the head-of-line, adding the corresponding request to a lock's linked list is simply a matter of adjusting queue pointers in memory 146 and, potentially, the corresponding head and tail pointers in memory 144. Since the CAM 142 performs dual duties in this scheme, the implementation can alternate reorder and lock operations each cycle (e.g., on odd cycles the CAM 142 performs a search for a reorder entry while on even cycles the CAM 142 performs a search for a lock entry).

The implementation shown also features a memory 140 that stores the "head" (e.g., 124 in FIG. 3A) identifiers for each sequence domain. The head identifiers indicate the next sequenced request to be forwarded to the lock circuitry 112 for a given sequence domain. In addition, the memory 140 stores a "high" pointer that indicates the "highest" sequence number (e.g., most terminal in a sequence) received for a domain. Because the sequence numbers wrap, the "highest" sequence number may be a lower number than the "head" pointer.

When a sequenced lock request arrives, the domain identified in the request is used as an index into memory 140. If the request sequence number does not match the "head" number (i.e., the sequence number of the request was not at the head-of-line), a CAM 142 reorder entry is allocated (e.g., by accessing a freelist) and written for the request identifying the domain and sequence number. The request data itself including the lock number, type of request, and other data (e.g., identification of the requesting core and/or thread) is stored in memory 146 and a pointer written into memory 144 corresponding to the allocated CAM 142 entry. Potentially, the "high" number for the sequence domain is altered if the request is at the end of the currently formed reorder sequence in CAM 142.

When a sequenced lock request matches the "head" number in table 140, the request represents the next request in the sequence to be serviced and the CAM 142 is searched for the identified lock entry. If no lock is found, a lock is written into the CAM 142 and the lock request is immediately granted. If the requested lock is found within the CAM 142 (e.g., another thread currently owns the lock), the request is appended to the lock's linked list by writing the request into memory 146 and adjusting the various pointers.

As described above, arrival of a request may free previously received out-of-order requests in the sequence. Thus, the circuitry increments the "head" for the domain and performs a CAM 142 search for the next number in the sequence domain. If a hit occurs, the process described above repeats for the queued request. The process repeats for each in-order pending sequence request yielding a CAM 142 hit until a CAM 142 miss results. To avoid the final CAM 142 miss, however, the implementation may not perform a CAM 142 search if the "head" pointer has incremented passed the "high" pointer. This will occur for the very common case when locks are being requested in sequence order, thereby improving performance (e.g., only one CAM 142 lookup will be tried because high value is equal to head value, not two with the second one missing, which would be needed without the "high" value).

The implementation also handles other lock manager operations described above. For example, when the circuitry receives a "release" request to return an unused sequence number, the implementation can write a "skip" flag into the CAM entry for the domain/sequence number. Similarly, when the circuitry receives a non-blocking request the circuitry can perform a simple lock search of CAM 142. Likewise, when the circuitry receives a non-sequenced request, the circuitry can allocate a lock and/or add the request to a link list queue for the lock.

Figure 5A:
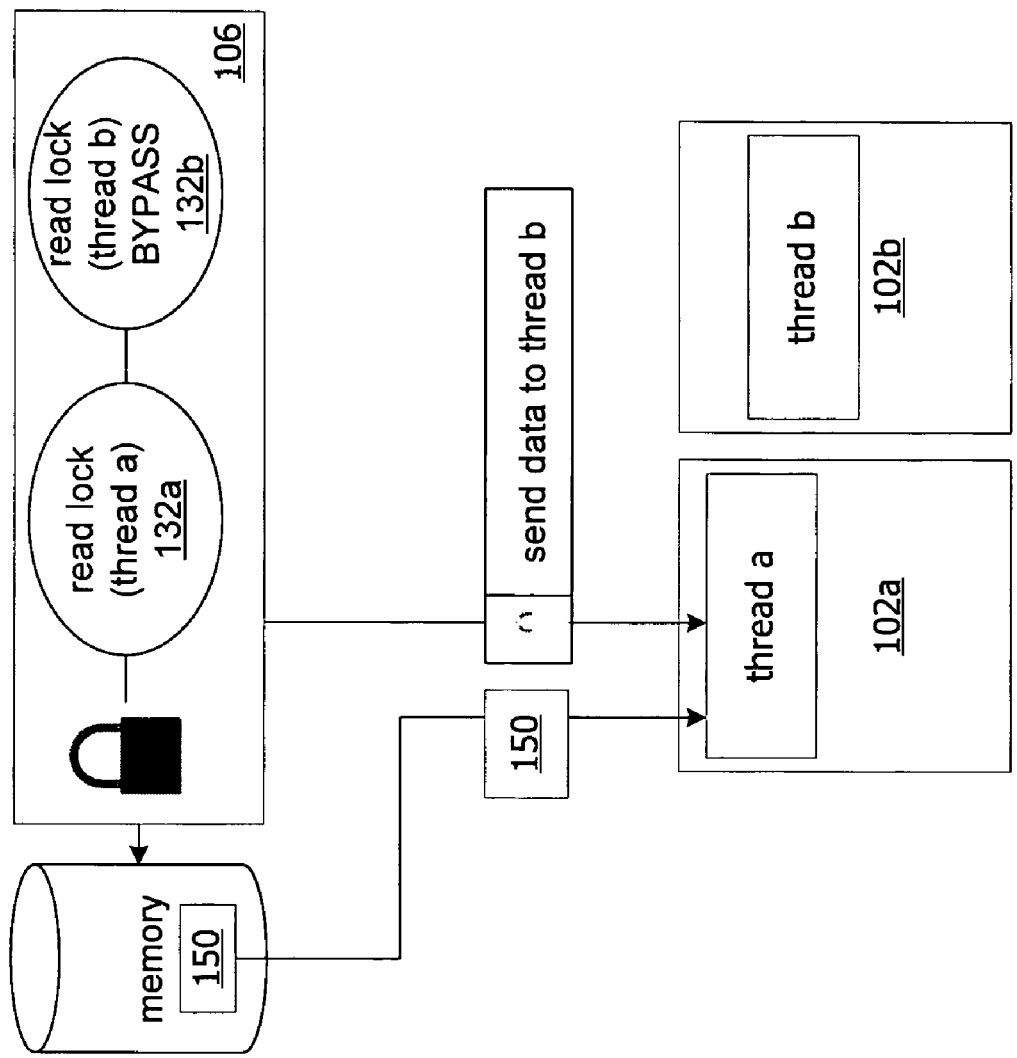
FIGS. 5A-5C are diagrams illustrating data passing between threads accessing a lock.
Figure 5B:
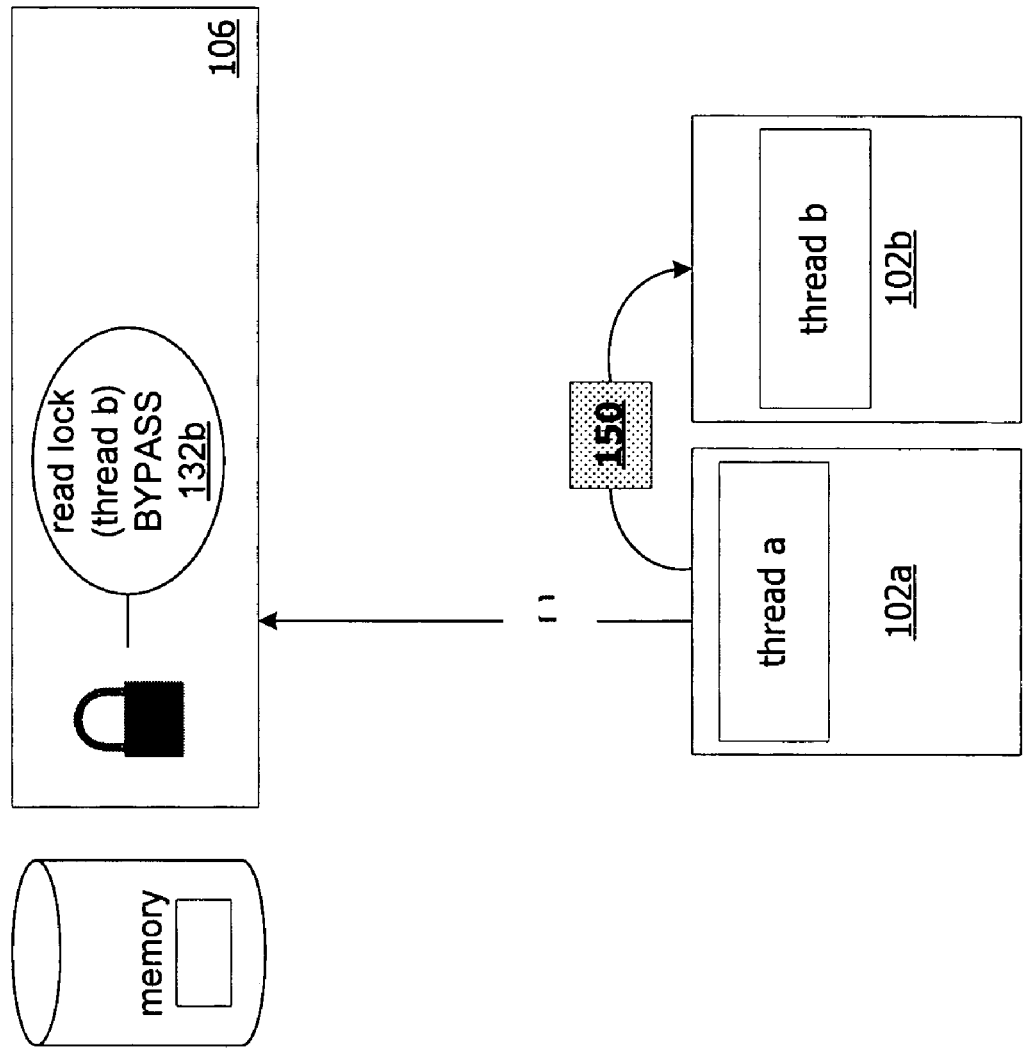
Figure 6:
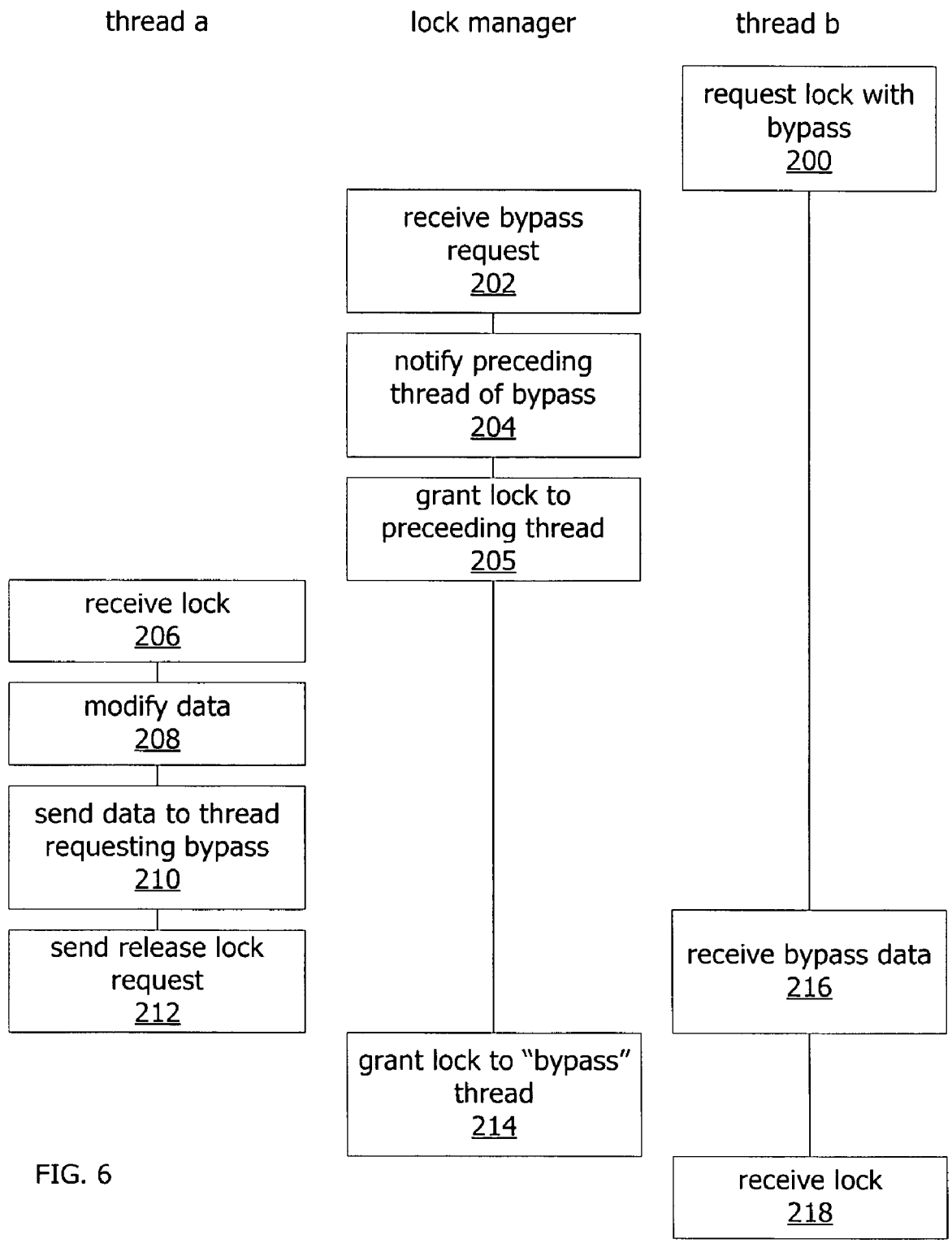
FIG. 6 is a flow-chart illustrating data passing between threads accessing a lock.

Typically, after acquiring a lock, a thread entering a critical section performs a memory read to obtain data protected by the lock. The data may be stored off-chip in external SRAM or DRAM, thereby, introducing potentially significant latency into reading/writing the data. After modification, the thread writes the shared data back to memory for another thread to access. As described above, in response to a read lock request, the lock manager 106 can initiate delivery of the data from memory to the thread on the thread's behalf, reducing the time it takes for the thread to obtain a copy of the data. FIGS. 5A-5B and 6 illustrate another technique to speed delivery of data to threads. In this scheme, instead of a thread writing modified data back to memory only to have another thread read the data from memory, the write-back to memory is bypassed in favor of delivery of the data from one thread to another thread waiting for the data. This inter-thread communication technique can have considerable impact when a burst of packets belongs to the same flow.

To illustrate bypassing, FIG. 5A depicts a lock queue that features two pending lock requests 132a, 132b. As shown, the lock manager 106 services the first read-lock request 132a from thread "a" by initiating a read operation for lock protected data 150 on the thread's behalf and sending data granting the lock to thread "a". In addition, because the following queued request 132b for thread "b" specified the data "bypass" option, the lock manager 106 sends a notification message to thread "a" indicating that the lock protected data should be sent to thread "b" of core 102b after modification. The message notifying thread "a" of the upcoming bypass operation can be sent as soon as the read lock bypass request is received by the lock manager 106. The granting of the lock and the notifying of thread "a" of the next thread to receive the lock may be included in the same or different messages.

Figure 5C:
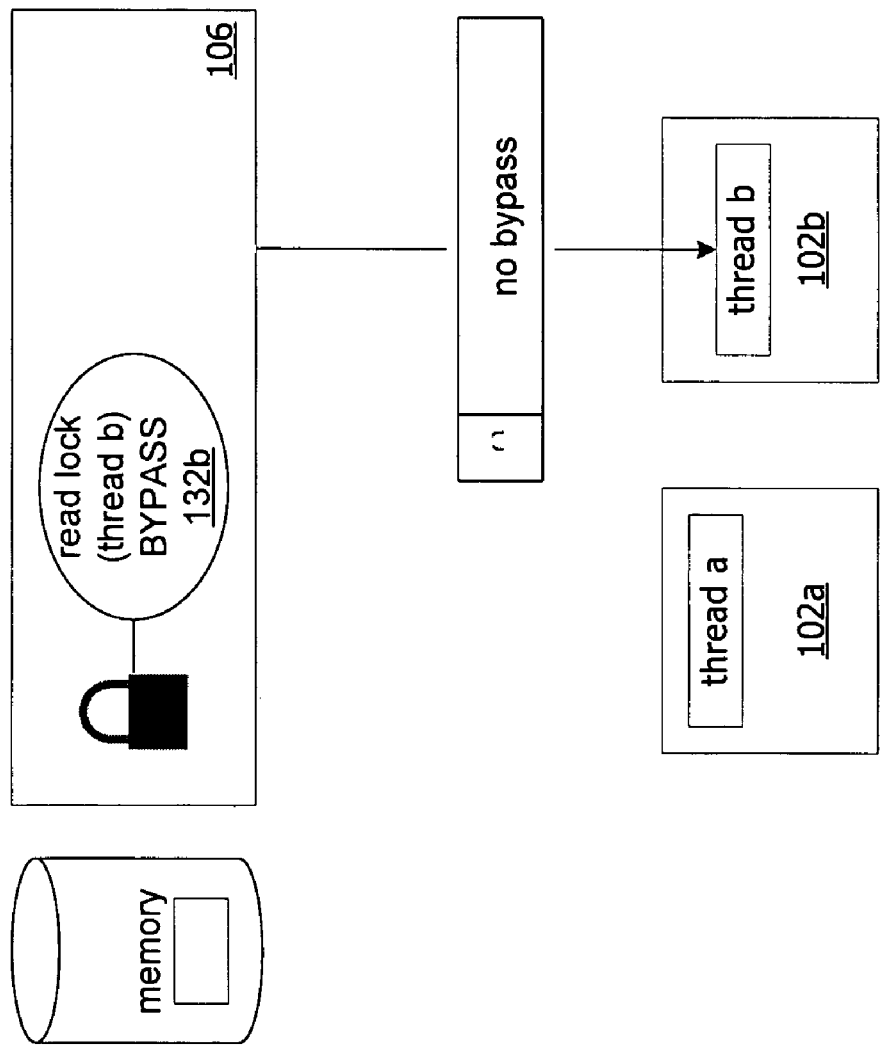

As shown in FIG. 5B, before releasing the lock, thread "a" sends the, potentially modified, data 150 to thread "b". For example, the thread "a" may use an instruction (e.g., a "reflect" instruction) that permits inter-core communication. Alternately, for data being passed between threads being executed by the same core, the data can be written directly into local core memory. After initiating the transfer of data, thread "a" can release the lock. As shown, in FIG. 5C, the lock manager 106 then grants the lock to thread "b". Since no queued bypass request follows thread "b", the lock manager can send the thread "Null" bypass information that thread "b" can use to determine that any modified data should be written back to memory instead of being passed to a next thread.

Potentially, bypassing may be limited to scenarios when there are at least two pending requests in a lock's queue to avoid a potential race condition. For example, in FIG. 5C, if a read lock request specifying the bypass option arrived after thread "b" obtained the lock, thread "b" may have already written the data to memory before new bypass information arrived from the lock manager. Of course, even in such a situation the thread can both write the data to memory and write the data directly to the thread requesting the bypass.

FIG. 6 depicts a flow diagram illustrating operation of the bypass logic. As shown, a thread "b" makes a read lock request 200 specifying the bypass option. After receiving the request 202, the lock manager may notify 204 thread "a" that thread "b" specified the bypass option and identify the location in thread "b"'s core to write the lock protected data. The lock manager may also grant 205 the lock in response to a previously queued request from thread "a".

After receiving the lock grant 206 and modifying lock protected data 208, thread "b" can send 210 the modified data directly to thread "b" without necessarily writing the data to shared memory. After sending the data, thread "a" releases the lock 212 after which the manager grants the lock to thread "b" 214. Thread "b" receives the lock 218 having potentially already received 216 the lock protected data and can immediately begin critical section execution.

Figure 7:
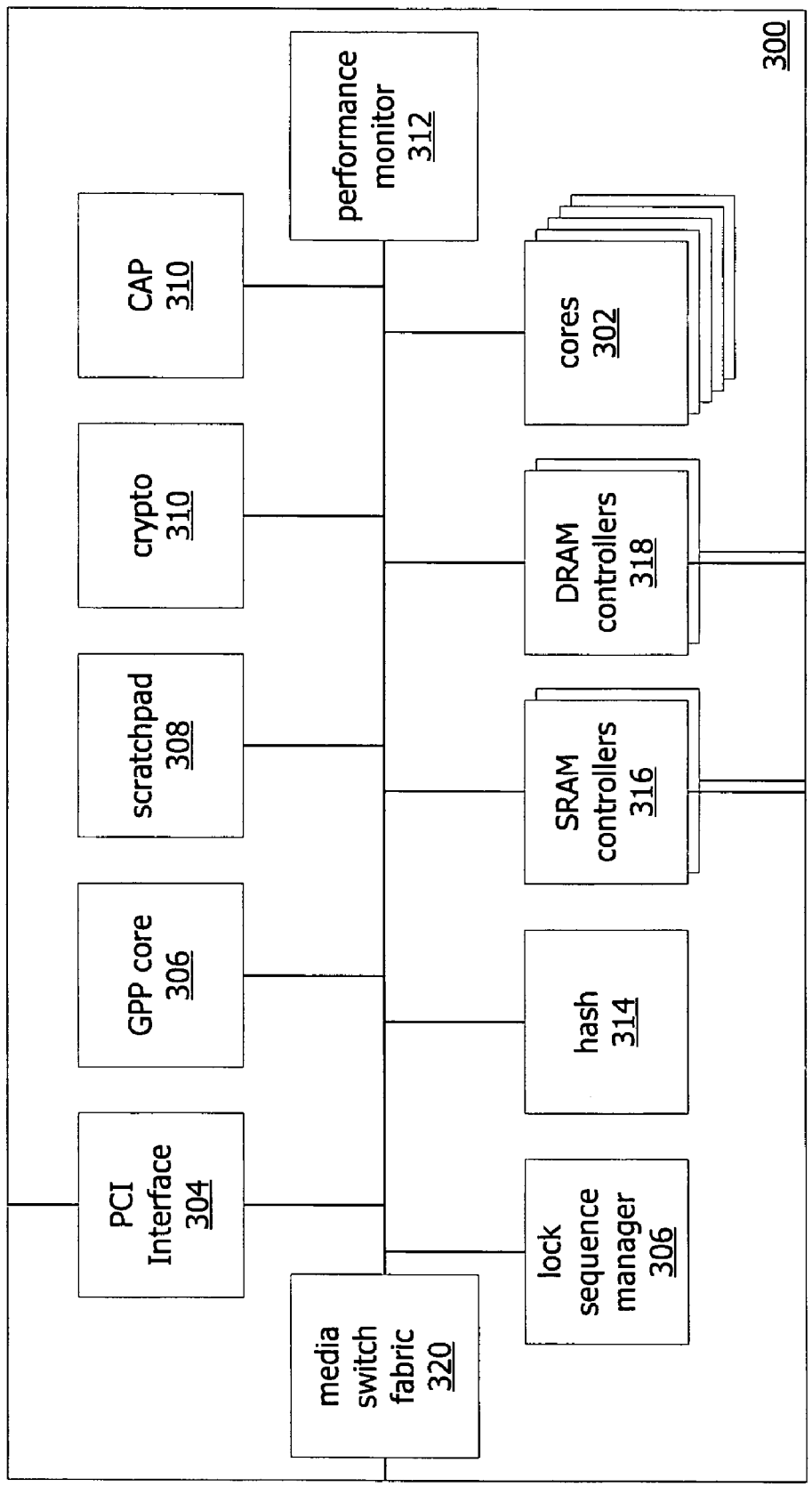
FIG. 7 is a diagram of a network processor having multiple programmable units.

The techniques describe above can be implemented in a variety of ways and in different environments. For example, lock manager hardware may be integrated within a network processor. As an example, FIG. 7 depicts an example of network processor 300 that can be programmed to process packets. The network processor 300 shown is an Intel® Internet eXchange network Processor (IXP). Other processors feature different designs.

In addition to the lock manager hardware 306, the network processor 300 shown features a collection of programmable processing cores 302 (e.g., programmable units) on a single integrated semiconductor die. Each core 302 may be a Reduced Instruction Set Computer (RISC) processor tailored for packet processing. For example, the cores 302 may not provide floating point or integer division instructions commonly provided by the instruction sets of general purpose processors. Individual cores 302 may provide multiple threads of execution. For example, a core 302 may store multiple program counters and other context data for different threads.

As shown, the network processor 300 also features an interface 320 that can carry packets between the processor 300 and other network components. For example, the processor 300 can feature a switch fabric interface 320 (e.g., a Common Switch Interface (CSIX)) that enables the processor 300 to transmit a packet to other processor(s) or circuitry connected to a switch fabric. The processor 300 can also feature an interface 320 (e.g., a System Packet Interface (SPI) interface) that enables the processor 300 to communicate with physical layer (PHY) and/or link layer devices (e.g., Media Access Controller (MAC) or framer devices). The processor 300 may also include an interface 304 (e.g., a Peripheral Component Interconnect (PCI) bus interface) for communicating, for example, with a host or other network processors.

As shown, the processor 300 includes other components shared by the cores 302 such as a cryptography core 310 that aids in cryptographic operations, internal scratchpad memory 308 shared by the cores 302, and memory controllers 316, 318 that provide access to external memory shared by the cores 302. The network processor 300 also includes a general purpose processor 306 (e.g., a StrongARM® XScale® or Intel Architecture core) that is often programmed to perform "control plane" or "slow path" tasks involved in network operations while the cores 302 are often programmed to perform "data plane" or "fast path" tasks.

The cores 302 may communicate with other cores 302 via the shared resources (e.g., by writing data to external memory or the scratchpad 308). The cores 302 may also intercommunicate via neighbor registers directly wired to adjacent core(s) 302. The cores 302 may also communicate via a CAP (CSR (Control Status Register) Access Proxy) 310 unit that routes data between cores 302.

Figure 8:
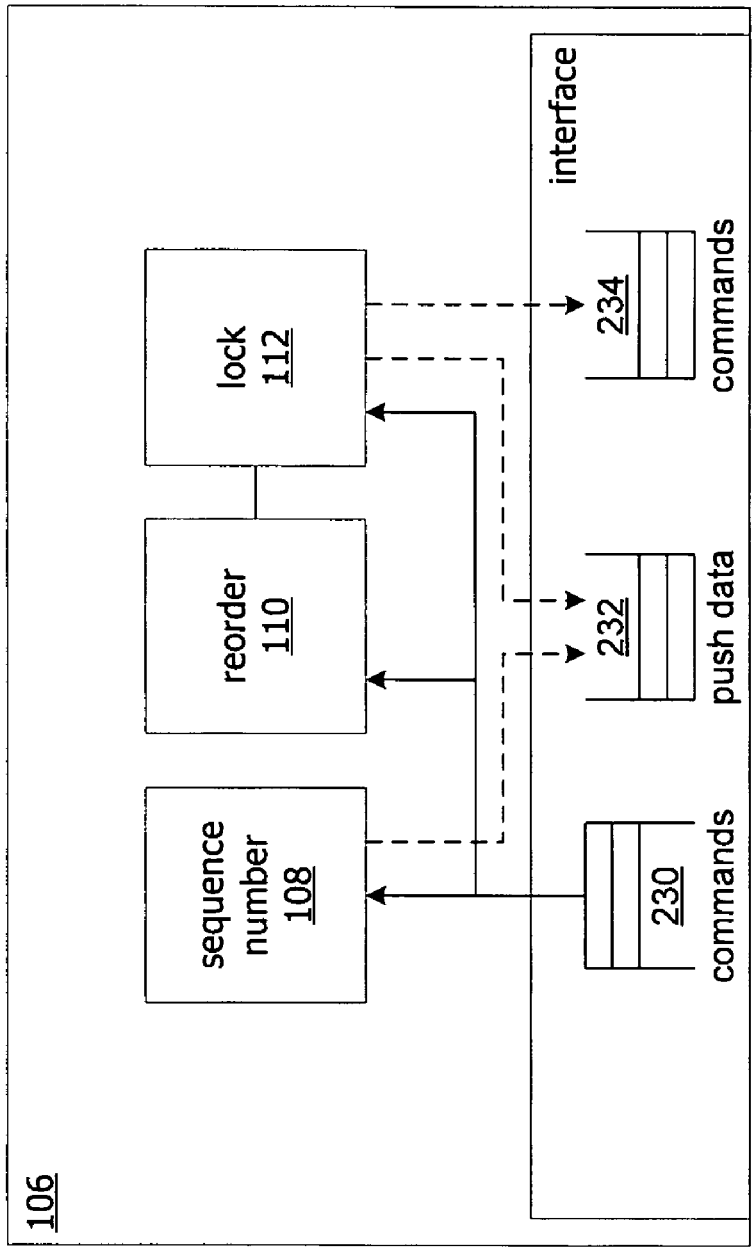
FIG. 8 is a diagram of a lock manager integrated within the network processor.

The different components may be coupled by a command bus that moves commands between components and a push/pull bus that moves data on behalf of the components into/from identified targets (e.g., the transfer register of a particular core or a memory controller queue). FIG. 8 depicts a lock manager 106 interface to these buses. For example, commands being sent to the manager 106 can be sent by a command bus arbiter to a command queue 230 based on a request from a core 302. Similarly, commands (e.g., memory reads for read-lock commands) may be sent from the lock manager from commands queue 234. The lock manager 106 can send data (e.g., granting a lock, sending bypass information, and/or identifying an allocated sequence number) via a queue 232 coupled to a push or pull bus interconnecting processor components.

The manager 106 can process a variety of commands including those that identify operations described above, namely, a sequence number request, a sequenced lock request, a sequenced read-lock request, a non-sequenced lock request, a non-blocking lock request, a lock release request, and an unlock request. A sample implementation is shown in Appendix A. The listed core instructions cause a core to issue a corresponding command to the manager 106.

Figure 9:
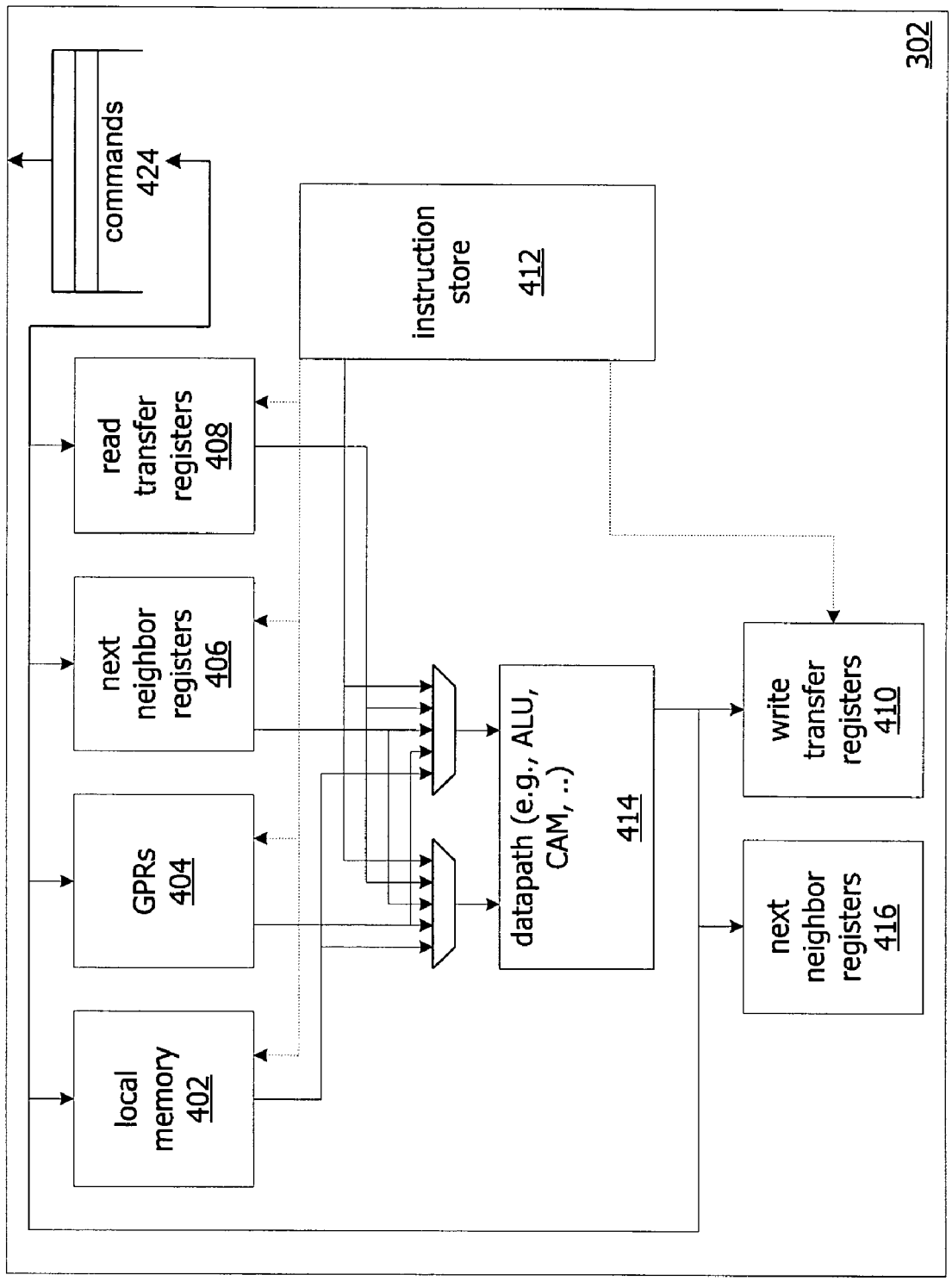
FIG. 9 is a diagram of a programmable unit.

FIG. 9 depicts a sample core 302 in greater detail. As shown the core 302 includes an instruction store 412 to store programming instructions processed by a datapath 414. The datapath 414 may include an ALU (Arithmetic Logic Unit), Content Addressable Memory (CAM), shifter, and/or other hardware to perform other operations. The core 302 includes a variety of memory resources such as local memory 402 and general purpose registers 404. The core 302 shown also includes read and write transfer registers 408, 410 that store information being sent to/received from components external to the core and next neighbor registers 406, 416 that store information being directly sent to/received from other cores 302. The data stored in the different memory resources may be used as operands in the instructions and may also hold the results of datapath instruction processing. As shown, the core 302 also includes a commands queue 424 that buffers commands (e.g., memory access commands) being sent to targets external to the core.

To interact with the lock manager 106, threads executing on the core 302 may send lock manager commands via the commands queue 424. These commands may identify transfer registers within the core 302 as the destination for command results (e.g., an allocated sequence number, data read for a read-lock, and so forth). In addition, the core 302 may feature an instruction set to reduce idle core cycles. For example, the core 302 may provide a ctx_arb (context arbitration) instruction that enables a thread to swap out/stall thread execution until receiving a signal associated with some operation (e.g., granting of a lock or receipt of a sequence number).

FIG. 10 illustrates an example of source code of a thread using lock manager services. As shown, the thread first acquires a sequence number ("get_seq_num") and associates a signal (sig__1) that is set when the sequence number have been written to the executing thread's core transfer registers. The thread then swaps out ("ctx_arb") until the sequence number signal (sig__1) is set. The thread then issues a read-lock request to the lock manager 106 and specifies a signal to be set when the lock is granted and again swaps out. After obtaining the grant, the thread can resume execution and can execute the critical section code. Finally, before returning the lock ("unlock"), the thread writes data back to memory.

Figure 11:
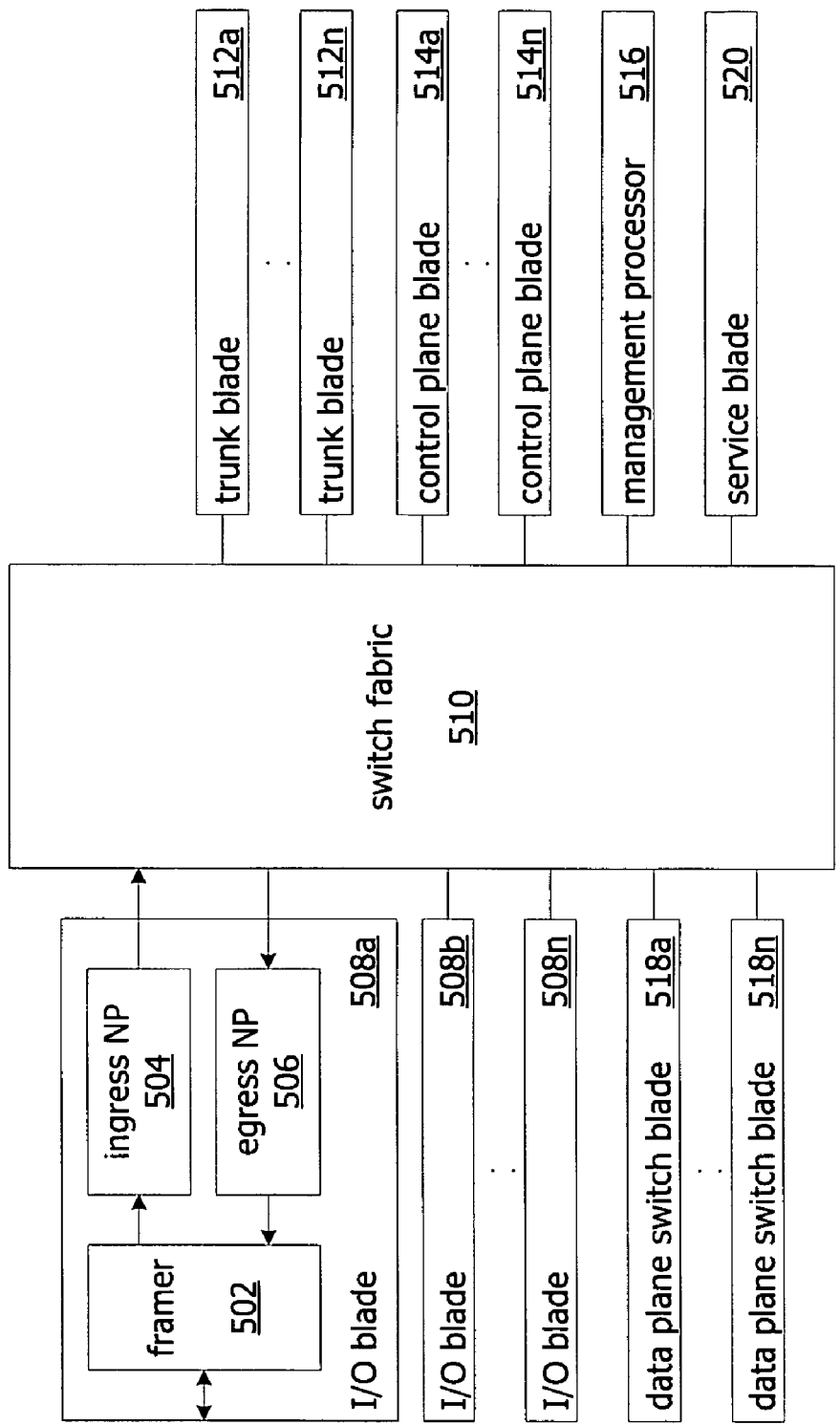
FIG. 11 is a diagram of a network forwarding device.

FIG. 11 depicts a network device that can process packets using a lock manager described above. As shown, the device features a collection of blades 508-520 holding integrated circuitry interconnected by a switch fabric 510 (e.g., a crossbar or shared memory switch fabric). As shown the device features a variety of blades performing different operations such as I/O blades 508a-508n, data plane switch blades 518a-518b, trunk blades 512a-512b, control plane blades 514a-514n, and service blades. The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual blades (e.g., 508a) may include one or more physical layer (PHY) devices (not shown) (e.g., optic, wire, and wireless PHYs) that handle communication over network connections. The line cards 508-520 may also include framer devices (e.g., Ethernet, Synchronous Optic Network (SONET), High-Level Data Link (HDLC) framers or other "layer 2" devices) 502 that can perform operations on frames such as error detection and/or correction. The blades 508a shown may also include one or more network processors 504, 506 that perform packet processing operations for packets received via the PHY(s) 502 and direct the packets, via the switch fabric 510, to a blade providing an egress interface to forward the packet. Potentially, the network processor(s) 506 may perform "layer 2" duties instead of the framer devices 502. The network processors 504, 506 may feature lock managers implementing techniques described above.

While FIGS. 7-11 described specific examples of a network processor and a device incorporating network processors, the techniques may be implemented in a variety of architectures including processors and devices having designs other than those shown. Additionally, the techniques may be used in a wide variety of network devices (e.g., a router, switch, bridge, hub, traffic generator, and so forth).

The term circuitry as used herein includes hardwired circuitry, digital circuitry, analog circuitry, and so forth. Techniques described above may be implemented in computer programs, for example, that cause a processor (e.g., cores 302) to use a lock manager as described above.

Other embodiments are within the scope of the following claims.

What is claimed is:

1. A processor, comprising:
    multiple programmable units integrated on a single die, each of the multiple programmable units to provide multiple program threads of execution; and
    circuitry integrated on the die, communicatively coupled to the multiple programmable units, the circuitry to reorder and grant lock requests received from the threads provided by the multiple programmable units based on an order in which the threads requested insertion into a sequence of lock grants, said circuitry configured to:
    (1) (a) receive a request for a sequence number for a specified lock from a one of the multiple programmable units, the request specifying the lock and one of multiple sequence domains;
        (b) in response to the received request for the sequence number:
            determine a sequence number for the request within the specified sequence number domain; and
            send a response identifying the determined sequence number within the specified sequence number domain to the one of the multiple programmable units;
    (2) (a) receive a lock request specifying a sequence number and a sequence number domain;
        (b) in response to the received lock request:
            determine if the sequence number is the next sequence number in the sequence;
            if the sequence number is not the next sequence number in the sequence, store an identifier of the received lock request in a memory based on the specified sequence number and sequence number domain;
            if the sequence number is the next sequence number in the sequence, add the lock request to a queue of pending lock requests if the lock is currently locked and granting the lock request if the lock is currently unlocked;
    (3) (a) receive a lock request not specifying a sequence number;
        (b) in response to the lock request not specifying a sequence number:
            determine if the lock is currently granted to another thread;
            if the lock is currently granted to another thread, adding a queue entry for the received lock request;
            if the lock is not currently granted to another thread, granting the lock;
    (4) (a) receive an unlock request;
        (b) in response to the unlock request:
            determining if a queue associated with the lock has a pending lock request; and
            if it is determined the queue associated with the lock has a pending lock request, granting the lock to the pending lock request.

2. The processor of claim 1, wherein the circuitry comprises circuitry to allocate sequence numbers to, respective, threads of the multiple programmable units, the sequence numbers representing a place in the sequence of lock grants.

3. The processor of claim 1, wherein the circuitry further comprises circuitry to maintain a queue of pending requests for a lock.

4. The processor of claim 1, wherein the sequence comprises a sequence in one of multiple sequence domains.

5. The processor of claim 1, wherein the circuitry to grant the lock comprises circuitry to send a signal to a one of the multiple programmable units associated with the thread making the granted request.

6. The processor of claim 1, wherein the circuitry further comprises circuitry to issue a memory read operation for data associated with a lock and to cause the data to be delivered to the programmable unit receiving a lock grant.

7. The processor of claim 1, wherein each of the multiple programmable units comprises a programmable unit having an instruction set that enables a thread to be stalled until a lock grant is received.

8. The processor of claim 1, wherein the multiple programmable units each have an instruction set that includes one or more instructions to:
    request a sequence number;
    request a lock specifying the sequence number;
    request a lock without specifying a sequence number; and
    request a lock and delivery of data associated with the lock.

9. The processor of claim 1, further comprising memory to store data associated with different sequence domains, the data including a reference to a next sequence number awaiting servicing.

10. The processor of claim 9, wherein the data associated with different sequence domains comprises identification of a received lock request having a most terminal order in the sequence.

11. The processor of claim 1, wherein the circuitry comprises a content addressable memory, some of the entries in the content addressable memory specify a sequence number domain and identify a lock request.

12. The processor of claim 11,
    wherein the some of the entries in the content addressable memory are identified by a first flag value; and
    wherein other ones of the entries of the content addressable memory are identified by a second flag value and identify locks.

13. A method, comprising:
    (1) (a) receiving a request for a sequence number for a specified lock from at least one programmable unit, the request specifying the lock and one of multiple sequence domains;
        (b) in response to the received request for the sequence number:
            determining a sequence number for the request within the specified sequence number domain; and sending a response identifying the determined sequence number within the specified sequence number domain to the programmable unit;

(2) (a) receiving a lock request specifying a sequence number and a sequence number domain;

(b) in response to the received lock request:

determining if the sequence number is the next sequence number in the sequence;

if the sequence number is not the next sequence number in the sequence, storing an identifier of the received lock request in a memory based on the specified sequence number and sequence number domain;

if the sequence number is the next sequence number in the sequence, adding the lock request to a queue of pending lock requests if the lock is currently locked and granting the lock request if the lock is currently unlocked;

(3) (a) receiving a lock request not specifying a sequence number;

(b) in response to the lock request not specifying a sequence number:

determining if the lock is currently granted to another thread;

if the lock is currently granted to another thread, adding a queue entry for the received lock request;

if the lock is not currently granted to another thread, granting the lock;

(4) (a) receiving an unlock request;

(b) in response to the unlock request:

determining if a queue associated with the lock has a pending lock request; and if it is determined the queue associated with the lock has a pending lock request, granting the lock to the pending lock request.

14. The method of claim 13, further comprising allocating sequence numbers to, respective, threads of the multiple programmable units, the sequence numbers representing a place in the sequence of lock grants.

15. The method of claim 13, further comprising maintaining a queue of pending requests for a lock.

16. The method of claim 13, wherein the sequence comprises a sequence in one of multiple sequence domains.

17. The method of claim 13, further comprising issuing a memory read operation for data associated with a lock and to cause the data to be delivered to the programmable unit receiving a lock grant.

18. A network device, comprising:

a switch fabric; and multiple blades coupled to the switch fabric, at least one of the multiple blades including a processor having multiple multi-threaded programmable units integrated on a single die and circuitry, communicatively coupled to the multiple programmable units, the circuitry to reorder and grant received lock requests received from the multiple programmable units based on an order in which threads requested insertion into a sequence of lock grants, said circuitry configured to:

(1) (a) receive a request for a sequence number for a specified lock from a one of the multiple programmable units, the request specifying the lock and one of multiple sequence domains;

(b) in response to the received request for the sequence number:

determine a sequence number for the request within the specified sequence number domain; and send a response identifying the determined sequence number within the specified sequence number domain to the one of the multiple programmable units;

(2) (a) receive a lock request specifying a sequence number and a sequence number domain;

(b) in response to the received lock request:

determine if the sequence number is the next sequence number in the sequence;

if the sequence number is not the next sequence number in the sequence, store an identifier of the received lock request in a memory based on the specified sequence number and sequence number domain;

if the sequence number is the next sequence number in the sequence, add the lock request to a queue of pending lock requests if the lock is currently locked and granting the lock request if the lock is currently unlocked;

(3) (a) receive a lock request not specifying a sequence number;

(b) in response to the lock request not specifying a sequence number:

determine if the lock is currently granted to another thread;

if the lock is currently granted to another thread, adding a queue entry for the received lock request;

if the lock is not currently granted to another thread, granting the lock;

(4) (a) receive an unlock request;

(b) in response to the unlock request:

determining if a queue associated with the lock has a pending lock request; and if it is determined the queue associated with the lock has a pending lock request, granting the lock to the pending lock request.

19. The device of claim 18, wherein the circuitry comprises circuitry to allocate sequence numbers to, respective, threads of the multiple programmable units, the sequence numbers representing a place in the sequence of lock grants.

20. The device of claim 18, wherein the sequence comprises a sequence in one of multiple sequence domains.

21. The device of claim 18, wherein the circuitry further comprises circuitry to issue a memory read operation for data associated with a lock and to cause the data to be delivered to the programmable unit receiving a lock grant.

* * * * *